(No Model.)

N. A. NEWTON.
VEHICLE SPRING.

No. 462,323. Patented Nov. 3, 1891.

Witnesses.
J. C. Bostwick
R. L. Skinner

Inventor
Nelson A. Newton

UNITED STATES PATENT OFFICE.

NELSON A. NEWTON, OF KALAMAZOO, MICHIGAN.

VEHICLE-SPRING.

SPECIFICATION forming part of Letters Patent No. 462,323, dated November 3, 1891.

Application filed July 1, 1890. Serial No. 357,379. (No model.)

*To all whom it may concern:*

Be it known that I, NELSON A. NEWTON, a citizen of the United States, residing at Kalamazoo, in the county of Kalamazoo, in the State of Michigan, have invented a new and Improved Vehicle-Spring; and I do hereby declare that the following is a full, clear, and exact description of the same.

This invention relates more particularly to torsion-springs consisting in each instance of a single bent rod or bar.

The object of said invention is to provide more perfectly than heretofore for an increase of resistance in such a spring-rod as the weight bearing on it increases, a light weight meeting with but little resistance in said spring. This object is attained by the especial construction of said rod or spring and its attachment to and combination with the wagon-body, substantially as hereinafter set forth and claimed.

Figure 1:
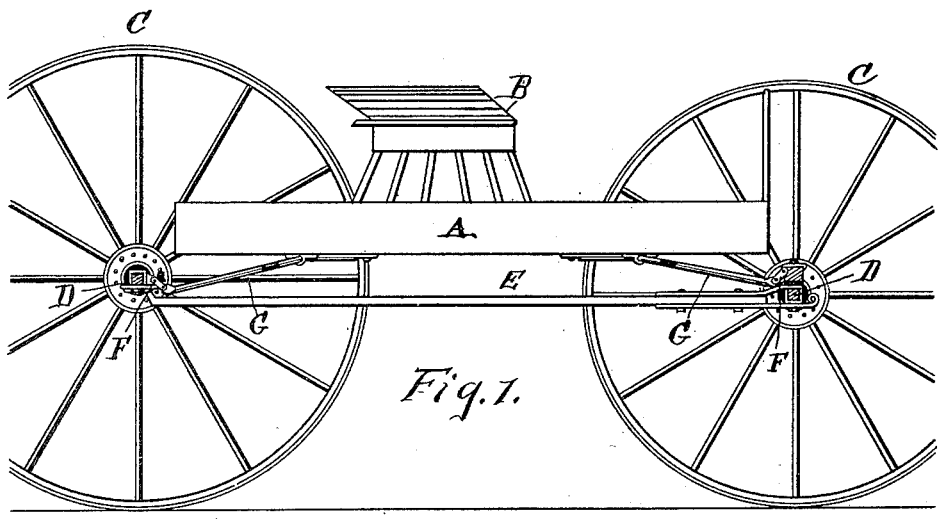
Figure 2:
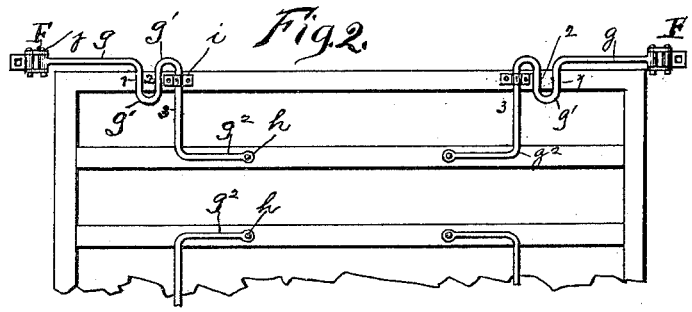
Figure 3:
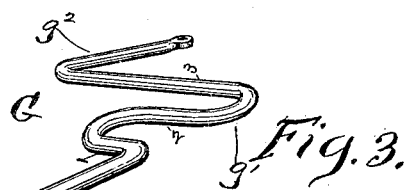

In the accompanying drawings, Figure 1 represents a side elevation of a wagon provided with springs embodying my invention. Fig. 2 represents a plan view of a part of the same, and Fig. 3 represents a detail perspective view of one of the springs.

A designates the wagon-body, B the seat, C the wheels, D the axles, E the reach, and F the clips for the attachment of the outer ends of the springs, all old.

Each spring G consists of a single rod formed into a long, straight, upwardly-inclined outer part $g$, longitudinal with respect to the wagon-body, an upwardly-inclined doubly-bent part $g'$, and a horizontal part $g^2$, which is bent at right angles and has its inner end fastened securely to the wagon-body. A clip or strap $i'$ fastens the outer portion of this bent horizontal part $g^2$ to the wagon-body, but leaves it free to turn, so that this part of the spring may be capable of torsional action. The forward end of each spring G is provided with a transverse eye G' for the bolt $j$, which fastens it to the clip F. The inner horizontal part $g^2$ and the doubly-bent part $g'$ form three parallel torsion bars, which I have marked 1, 2, and 3, extending at right angles to the side of the wagon and below and partly outside of the latter. In use the inner torsion-bar 3 bears the first strain. As this strain becomes greater, owing to increase of weight, the other bars 2 and 1 successively share in bearing it, the spring stiffening accordingly. Thus a light weight is borne by an easily-flexible and lightly-elastic spring, and a heavy weight is borne by a stiff and strongly-resisting spring, and the three torsion-bars mark three different grades or degrees of such resistance, the same spring-rod bent into the shape above described and arranged and fastened, as stated, answering all purposes.

Having thus described my invention, what I claim as new, and desire to secure by Letters Patent, is—

A torsion-spring for a wagon-body, consisting of a long outer part $g$, attached to the axle, an inner horizontal part $g^2$, attached to the said wagon-body, but having its outer portion free to turn for torsion, and an intermediate doubly-bent part $g'$, the said parts $g'$ and $g^2$ forming three torsion-bars arranged transversely with respect to the length of the wagon, and operating substantially as and for the purpose set forth.

NELSON A. NEWTON.

In presence of—
J. H. BOSTWICK,
R. L. SKIMER.